(12) United States Patent
Adibi et al.

(10) Patent No.: US 10,812,655 B1
(45) Date of Patent: Oct. 20, 2020

(54) METHODS AND SYSTEMS FOR SEAMLESS OUTBOUND COLD CALLS USING VIRTUAL AGENTS

(71) Applicant: Talkdesk, Inc., San Francisco, CA (US)

(72) Inventors: Jafar Adibi, Los Angeles, CA (US); Tiago Paiva, San Francisco, CA (US); Bruno Antunes, São Silvestre (PT)

(73) Assignee: TALKDESK INC., San Francisco, CA (US)

( * ) Notice: Subject to any disclaimer, the term of this patent is extended or adjusted under 35 U.S.C. 154(b) by 0 days.

(21) Appl. No.: 16/668,343

(22) Filed: Oct. 30, 2019

(51) Int. Cl.
| | |
|---|---|
| *H04M 3/51* | (2006.01) |
| *G10L 15/22* | (2006.01) |
| *G10L 13/047* | (2013.01) |
| *G10L 15/18* | (2013.01) |
| *G10L 13/033* | (2013.01) |
| *G10L 13/04* | (2013.01) |

(52) U.S. Cl.
CPC ......... *H04M 3/5158* (2013.01); *G10L 13/033* (2013.01); *G10L 13/043* (2013.01); *G10L 13/047* (2013.01); *G10L 15/1815* (2013.01); *G10L 15/22* (2013.01); *H04M 3/5166* (2013.01); *G10L 2015/223* (2013.01)

(58) Field of Classification Search
CPC . H04M 3/5158; H04M 3/5166; G10L 13/033; G10L 13/043; G10L 13/047; G10L 15/1815; G10L 15/22; G10L 2015/223
USPC .................. 379/266.07, 265.01, 266.01, 309
See application file for complete search history.

(56) References Cited

U.S. PATENT DOCUMENTS

| | | | |
|---|---|---|---|
| 9,300,801 B1* | 3/2016 | Warford | H04M 3/5175 |
| 2007/0036334 A1* | 2/2007 | Culbertson | H04M 3/4938 |
| | | | 379/266.01 |
| 2007/0121902 A1* | 5/2007 | Stoica | G06Q 10/10 |
| | | | 379/265.11 |
| 2014/0254790 A1* | 9/2014 | Shaffer | H04M 3/5233 |
| | | | 379/265.11 |
| 2020/0125919 A1* | 4/2020 | Liu | G06Q 30/0617 |

* cited by examiner

*Primary Examiner* — Quynh H Nguyen (57) ABSTRACT

A Virtual agent that is a fully automated computer software solution that can engage with real people, customers, clients and even other agents. Virtual agents have personality with animation and engage with the customer via text or voice or a combination of both as an actual person. Virtual agents are able to answer customer questions and provide information to address their issues. Virtual agents transfer calls to live agents if they cannot address customer issues.

20 Claims, 10 Drawing Sheets

METHODS AND SYSTEMS FOR SEAMLESS OUTBOUND COLD CALLS USING VIRTUAL AGENTS

BACKGROUND

A Virtual Agent is an computer generated virtual persona that serves as an online customer service representative. Virtual agents conduct a conversation with users and respond to their questions and may also perform adequate non-verbal behavior. Conventional virtual agents modernized customer care by attempting to personalize the interaction between the virtual agent and the customer. Some virtual agents can speak naturally and use adaptive technologies to understand customer needs. However, conventional virtual agents remain limited in how they interact with customers because they lack full customization and personalization, and lack the authority to make decisions that resolve customer needs. Thus, there is a need for a solution to enhance the virtual agent experience to enhance the interactions with customers who interact with contact centers.

SUMMARY

Disclosed herein are systems and methods for providing a cloud-based contact center solution providing a virtual agent for handling of interactions through the use of e.g., artificial intelligence and the like.

In accordance with an aspect, there is disclosed a method, comprising making an outbound call to contact a perspective customer; receiving, by a virtual agent, first speech input from the perspective customer; converting the first speech to first text for analysis by a knowledge graph engine to retrieve responsive information to the first text from multiple sources and providing the information to a virtual agent engine; converting the responsive information to second speech that is provided to the perspective customer; and repeating the receiving and converting of the first speech and the second speech until the perspective customer is ready to be seamlessly transferred to a human agent or until the outbound call is terminated. In accordance with another aspect, a cloud-based software platform is disclosed in which the example method above is performed.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

The present disclosure is generally directed to a cloud-based contact center and, more particularly, methods and systems for proving intelligent, automated services within a cloud-based contact center. With the rise of cloud-based computing, contact centers that take advantage of this infrastructure are able to quickly add new features and channels. Cloud-based contact centers improve the customer experience by leveraging application programming interfaces (APIs) and software development kits (SDKs) to allow the contact center to change in in response to an enterprise's needs. For example, communications channels may be easily added as the APIs and SDKs enable adding channels, such as SMS/MMS, social media, web, etc. Cloud-based contact centers provide a platform that enables frequent updates. Yet another advantage of cloud-based contact centers is increased reliability, as cloud-based contact centers may be strategically and geographically distributed around the world to optimally route calls to reduce latency and provide the highest quality experience. As such, customers are connected to agents faster and more efficiently.

Example Cloud-Based Contact Center Architecture

Figure 1:
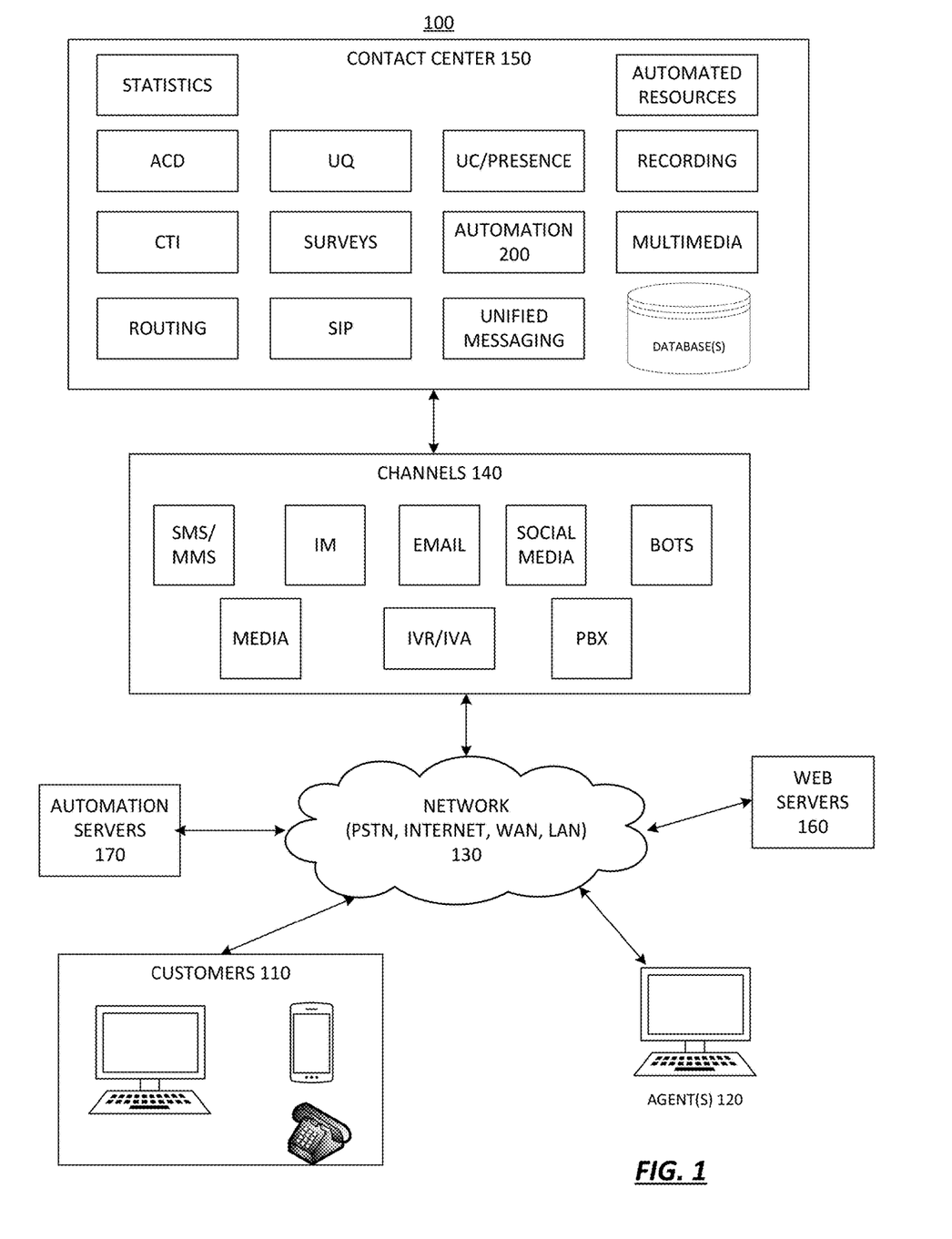
FIG. 1 illustrates an example environment.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with agent(s) 120 through a network 100 and one or more channels 140. The agent(s) 120 may be remote from the contact center 150 and handle communications with customers 110 on behalf of an enterprise or other entity. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

The contact center 150 may be cloud-based and distributed over a plurality of locations. The contact center 150 may include servers, databases, and other components. In particular, the contact center 150 may include, but is not limited to, a routing server, a SIP server, an outbound server, automated call distribution (ACD), a computer telephony integration server (CTI), an email server, an IM server, a social server, a SMS server, and one or more databases for routing, historical information and campaigns.

The routing server may serve as an adapter or interface between the switch and the remainder of the routing, monitoring, and other communication-handling components of the contact center. The routing server may be configured to process PSTN calls, VoIP calls, and the like. For example, the routing server may be configured with the CTI server software for interfacing with the switch/media gateway and contact center equipment. In other examples, the routing server may include the SIP server for processing SIP calls. The routing server may extract data about the customer interaction such as the caller's telephone number (often known as the automatic number identification (ANI) number), or the customer's internet protocol (IP) address, or email address, and communicate with other contact center components in processing the interaction.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered.

For inbound SIP messages, the routing server may use statistical data from the statistics server and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

Customers 110 may initiate inbound communications (e.g., telephony calls, emails, chats, video chats, social media posts, etc.) to the contact center 150 via an end user device. End user devices may be a communication device, such as, a telephone, wireless phone, smart phone, personal computer, electronic tablet, etc., to name some non-limiting examples. Customers 110 operating the end user devices may initiate, manage, and respond to telephone calls, emails, chats, text messaging, web-browsing sessions, and other multi-media transactions. Agent(s) 120 and customers 110 may communicate with each other and with other services over the network 100. For example, a customer calling on telephone handset may connect through the PSTN and terminate on a private branch exchange (PBX). A video call originating from a tablet may connect through the network 100 terminate on the media server. The channels 140 are coupled to the communications network 100 for receiving and transmitting telephony calls between customers 110 and the contact center 150. A media gateway may include a telephony switch or communication switch for routing within the contact center. The switch may be a hardware switching system or a soft switch implemented via software. For example, the media gateway may communicate with an automatic call distributor (ACD), a private branch exchange (PBX), an IP-based software switch and/or other switch to receive Internet-based interactions and/or telephone network-based interactions from a customer 110 and route those interactions to an agent 120. More detail of these interactions is provided below.

As another example, a customer smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers 110 to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. IVA systems may cover a variety of media channels in addition to voice, including, but not limited to social media, email, SMS/MMS, IM, etc. and they may communicate with their counterpart's application (not shown) within the contact center 150. The IVA system may be configured with a script for querying customers on their needs. The IVA system may ask an open-ended questions such as, for example, "How can I help you?" and the customer 110 may speak or otherwise enter a reason for contacting the contact center 150. The customer's response may then be used by a routing server to route the call or communication to an appropriate contact center resource.

In response, the routing server may find an appropriate agent 120 or automated resource to which an inbound customer communication is to be routed, for example, based on a routing strategy employed by the routing server, and further based on information about agent availability, skills, and other routing parameters provided, for example, by the statistics server. The routing server may query one or more databases, such as a customer database, which stores information about existing clients, such as contact information, service level agreement requirements, nature of previous customer contacts and actions taken by contact center to resolve any customer issues, etc. The routing server may query the customer information from the customer database via an ANI or any other information collected by the IVA system.

Once an appropriate agent and/or automated resource is identified as being available to handle a communication, a connection may be made between the customer 110 and an agent device of the identified agent 120 and/or the automate resource. Collected information about the customer and/or the customer's historical information may also be provided to the agent device for aiding the agent in better servicing the communication. In this regard, each agent device may include a telephone adapted for regular telephone calls, VoIP calls, etc. The agent device may also include a computer for communicating with one or more servers of the contact center and performing data processing associated with contact center operations, and for interfacing with customers via voice and other multimedia communication mechanisms.

The contact center 150 may also include a multimedia/social media server for engaging in media interactions other than voice interactions with the end user devices and/or other web servers 160. The media interactions may be related, for example, to email, vmail (voice mail through email), chat, video, text-messaging, web, social media, co-browsing, etc. In this regard, the multimedia/social media server may take the form of any IP router conventional in the art with specialized hardware and software for receiving, processing, and forwarding multi-media events.

The web servers 160 may include, for example, social media sites, such as, Facebook, Twitter, Instagram, etc. In this regard, the web servers 160 may be provided by third parties and/or maintained outside of the contact center 160 that communicate with the contact center 150 over the network 100. The web servers 160 may also provide web pages for the enterprise that is being supported by the contact center 150. End users may browse the web pages and get information about the enterprise's products and services. The web pages may also provide a mechanism for contacting the contact center, via, for example, web chat, voice call, email, WebRTC, etc.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center.

Automation

As shown in FIG. 1, automated services may enhance the operation of the contact center 150. In one aspect, the automated services may be implemented as an application running on a mobile device of a customer 110, one or more cloud computing devices (generally labeled automation servers 170 connected to the end user device over the network 100), one or more servers running in the contact center 150 (e.g., automation infrastructure 200), or combinations thereof.

Figure 2:
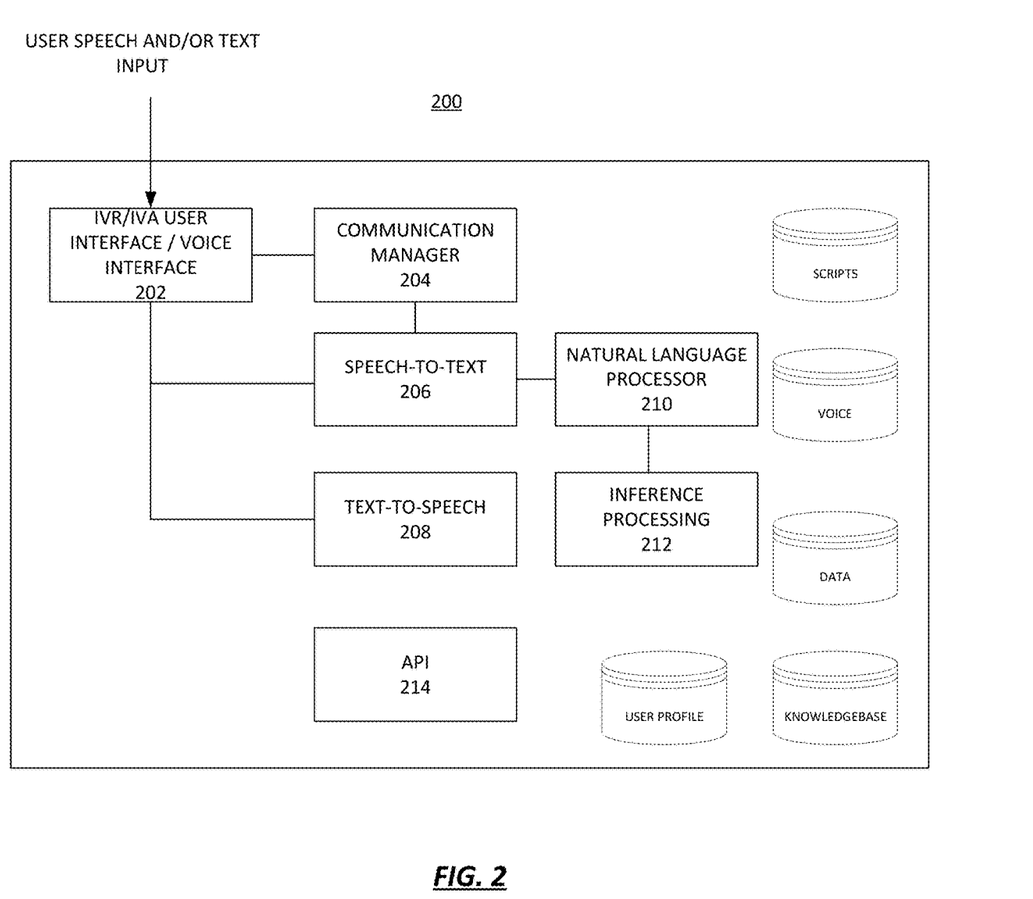
FIG. 2 illustrates example component that provide automation, routing and/or omnichannel functionalities within the context of the environment of FIG. 1.

With respect to the cloud-based contact center, FIG. 2 illustrates an example automation infrastructure 200 implemented within the cloud-based contact center 150. The automation infrastructure 200 may automatically collect information from a customer 110 user through, e.g., a user interface/voice interface 202, where the collection of information may not require the involvement of a live agent. The user input may be provided as free speech or text (e.g., unstructured, natural language input). This information may be used by the automation infrastructure 200 for routing the customer 110 to an agent 120, to automated resources in the contact center 150, as well as gathering information from other sources to be provided to the agent 120. In operation, the automation infrastructure 200 may parse the natural language user input using a natural language processing module 210 to infer the customer's intent using an intent inference module 212 in order to classify the intent. Where the user input is provided as speech, the speech is transcribed into text by a speech-to-text system 206 (e.g., a large vocabulary continuous speech recognition or LVCSR system) as part of the parsing by the natural language processing module 210. The communication manager 204 monitors user inputs and presents notifications within the user interface/voice interface 202. Responses by the automation infrastructure 200 to the customer 110 may be provided as speech using the text-to-speech system 208.

The intent inference module automatically infers the customer's 110 intent from the text of the user input using artificial intelligence or machine learning techniques. These artificial intelligence techniques may include, for example, identifying one or more keywords from the user input and searching a database of potential intents (e.g., call reasons) corresponding to the given keywords. The database of potential intents and the keywords corresponding to the intents may be automatically mined from a collection of historical interaction recordings, in which a customer may provide a statement of the issue, and in which the intent is explicitly encoded by an agent.

Some aspects of the present disclosure relate to automatically navigating an IVR system of a contact center on behalf of a user using, for example, the loaded script. In some implementations of the present disclosure, the script includes a set of fields (or parameters) of data that are expected to be required by the contact center in order to resolve the issue specified by the customer's 110 intent. In some implementations of the present disclosure, some of the fields of data are automatically loaded from a stored user profile. These stored fields may include, for example, the customer's 110 full name, address, customer account numbers, authentication information (e.g., answers to security questions) and the like.

Some aspects of the present disclosure relate to the automatic authentication of the customer 110 with the provider. For example, in some implementations of the present disclosure, the user profile may include authentication information that would typically be requested of users accessing customer support systems such as usernames, account identifying information, personal identification information (e.g., a social security number), and/or answers to security questions. As additional examples, the automation infrastructure 200 may have access to text messages and/or email messages sent to the customer's 110 account on the end user device in order to access one-time passwords sent to the customer 110, and/or may have access to a one-time password (OTP) generator stored locally on the end user device. Accordingly, implementations of the present disclosure may be capable of automatically authenticating the customer 110 with the contact center prior to an interaction.

In some implementations of the present disclosure an application programming interface (API) is used to interact with the provider directly. The provider may define a protocol for making commonplace requests to their systems. This API may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, a customer experience automation system 200 according to one implementation of the present disclosure automatically generates a formatted message in accordance with an API define by the provider, where the message contains the information specified by the script in appropriate portions of the formatted message.

Some aspects of the present disclosure relate to systems and methods for automating and augmenting aspects of an interaction between the customer 110 and a live agent of the contact center. In an implementation, once a interaction, such as through a phone call, has been initiated with the agent 120, metadata regarding the conversation is displayed to the customer 110 and/or agent 120 in the UI throughout the interaction. Information, such as call metadata, may be presented to the customer 110 through the UI 205 on the customer's 110 mobile device 105. Examples of such information might include, but not be limited to, the provider, department call reason, agent name, and a photo of the agent.

According to some aspects of implementations of the present disclosure, both the customer 110 and the agent 120 can share relevant content with each other through the application (e.g., the application running on the end user device). The agent may share their screen with the customer 110 or push relevant material to the customer 110.

In yet another implementation, the automation infrastructure 200 may also "listen" in on the conversation and automatically push relevant content from a knowledge base to the customer 110 and/or agent 120. For example, the application may use a real-time transcription of the customer's input (e.g., speech) to query a knowledgebase to provide a solution to the agent 120. The agent may share a document describing the solution with the customer 110. The application may include several layers of intelligence where it gathers customer intelligence to learn everything it can about why the customer 110 is calling. Next, it may perform conversation intelligence, which is extracting more context about the customer's intent. Next, it may perform interaction intelligence to pull information from other sources about customer 100. The automation infrastructure 200 may also perform contact center intelligence to implement WFM/WFO features of the contact center 150.

Virtual Agent Overview

In accordance with the present disclosure, is a design feature of the cloud-based contact center is to replace human agents by a virtual agent under applicable circumstances. The virtual agent is designed to solve an issue, take an order from the customer, authenticate a customer, etc. Virtual agents may be passive, i.e., they wait until someone contacts them or they may be active, i.e., they initiate outbound calls to customers that may be handed off to a live agent. More specifically, a virtual agent is automated computer software that engages with real people, customers 110 and/or agents 120. Virtual agents may have personality with animation and may engage with the customer 110 via text, voice or a combination of both as an actual person. Virtual agents are able to answer customer questions and provide information to address customer 110 and/or agent 120 issues. The virtual agents may be humanoid-like to the point that customers and agents cannot differentiate between virtual agents and live, human agents. In accordance with the present disclosure, the virtual agent, thus, is no longer a "bot," but rather very close to a human and may hold conversations and text interactions in real-time as if they were a human being. The virtual agent has a personality as well and if it cannot resolve an issue, the virtual agent "talks" to its supervisor or another agent, which are humans with, e.g., a different personality, capability, authority, voice etc. to resolve the issue. The cloud-based contact center 150 may route customers 110 to a virtual agent or a live agent 120 based on well known criteria (e.g., agent capacity and capabilities, IVR responses, authentication, anticipated wait times, etc.).

Figure 3:
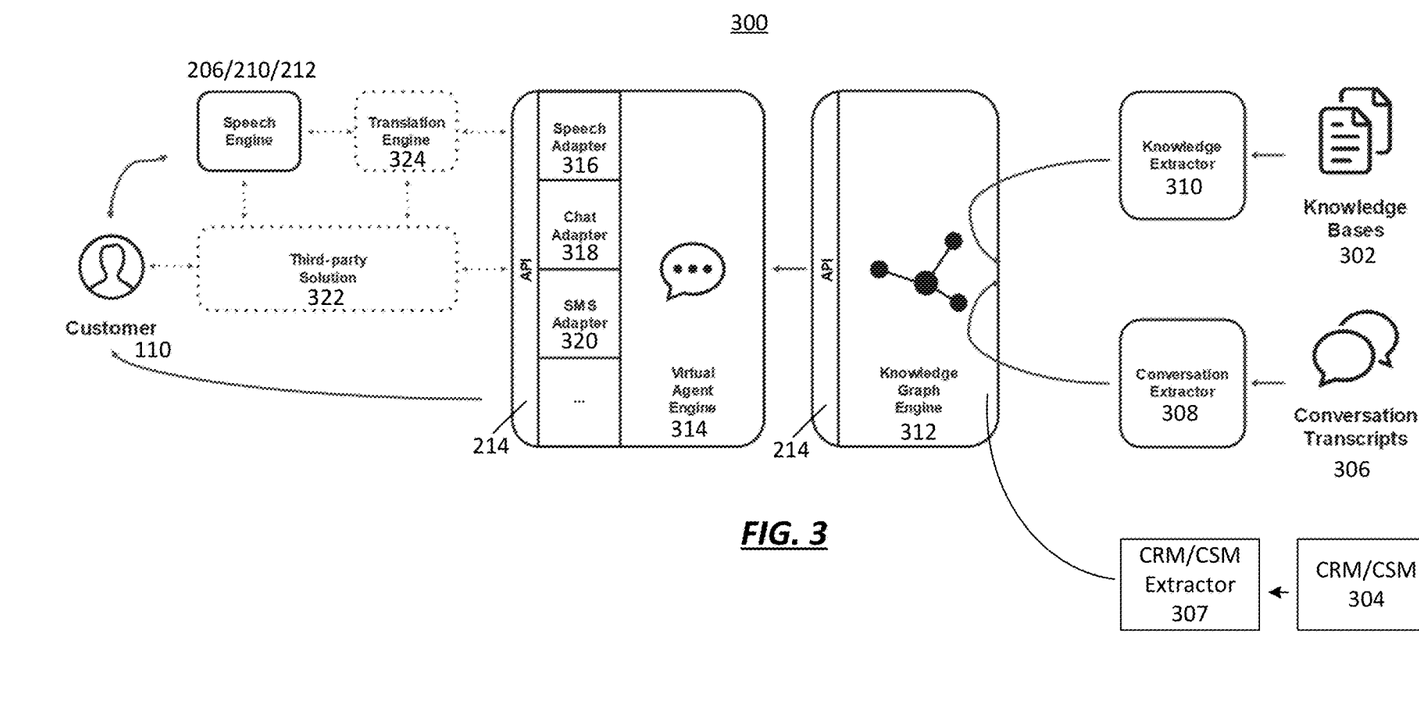
FIG. 3 shows example components and information flows within the cloud-based contact center that implement the virtual agent of the present disclosure.

FIG. 3 shows example components and information flows 300 within the cloud-based contact center 150 that implement the virtual agent of the present disclosure. The components may be implemented as part of, or in addition to, the automation infrastructure 200. In operation, a customer 110 will contact the cloud-based contact center 150 through one or more of the channels 140. as shown in FIG. 1. The virtual agent to whom the customer 110 is routed may "listen" to the customer 110 by a speech engine (components 206, 210 and/or 212 and/or translation 324) processing the customer's speech. The processed speech may be forwarded to a speech adapter 316 within a virtual agent engine 314. The virtual agent may interact with the customer over other channels/third-party solutions 322, e.g., chat, SMS, email, etc., that are input to respective adapters (i.e., a chat adapter 318, SMS adapter 320 and others) exposed via APIs 214.

The virtual agent engine 314 assigns the customer 110 to a virtual agent and will manage the message flows between the virtual agent and the customer. In some implementations, the virtual agent engine 314 maintains a map of queues serviced by virtual agents, tracks virtual agent sessions for recording/reporting agent events in a set of system statistics, reads site configuration values to identify which agents are virtual and which chat queues are serviced by virtual agents, and/or processes escalation rules and assigns chats requiring escalation to an appropriate live agent chat queue. The virtual agent engine 314 may associate a particular customer, organization, product, category, etc. with certain virtual agents, each having its own personality, capabilities, etc. as described below. In some implementations, the virtual agent engine 314 may apply rules to select an appropriate virtual agent. The rules may account for a product category, (e.g., smartphone, exercise equipment, etc.), customer identity (e.g., a high value customer), geographic location, time of day, etc. The rules may escalate a customer to a live agent 120. Upon an assignment of a customer 110 to a virtual agent, the virtual agent engine 314 updates a mapping between the selected virtual agent and the customer 110. The mapping may be used to route communication between the customer 110 and the selected virtual agent. If the assigned virtual agent is able to satisfy the customer's needs, the virtual agent engine 314 may update a reporting database and delete the mapping. However, if the assigned virtual agent is unable to satisfy the customer's needs, the customer may be escalated to an agent 120 or supervisor. The escalation may include notes from the interaction such that the agent or supervisor can seamlessly attend to the customer's needs. An example implementation of such notes is provided in 16/668,325, filed Oct. 30, 2019, entitled, "SYSTEM AND METHOD FOR ESCALATION USING AGENT ASSIST WITHIN A CLOUD-BASED CONTACT CENTER," which is incorporated herein by reference in its entirety. The mapping between the customer and the virtual agent is then deleted.

While the virtual agent is interacting with the customer 110, the virtual agent engine 314 may also receive information from a knowledge graph engine 312 exposed via APIs 214. The knowledge graph engine 312 gathers information from multiple sources and makes it available to the virtual agent engine 314. For example, the knowledge graph engine 312 may obtain information from one or more of a knowledgebase 302 (via a knowledge extractor 310), a customer relationship management (CRM) platform/a customer service management (CSM) platform 304 (via a CRM/CSM extractor 307), and/or conversational transcripts 306 of other agent conversations (via a conversation extractor 308) to provide contextually relevant information to the virtual agent engine 314. The extractors 306, 307 and 308 may include software that provides services and capabilities to the knowledge graph engine 312 to interact with the information sources 302, 304 and 306. The extractors 306, 307 and 308 may be handled data management, application services, messaging, authentication, and API management.

Figure 4:
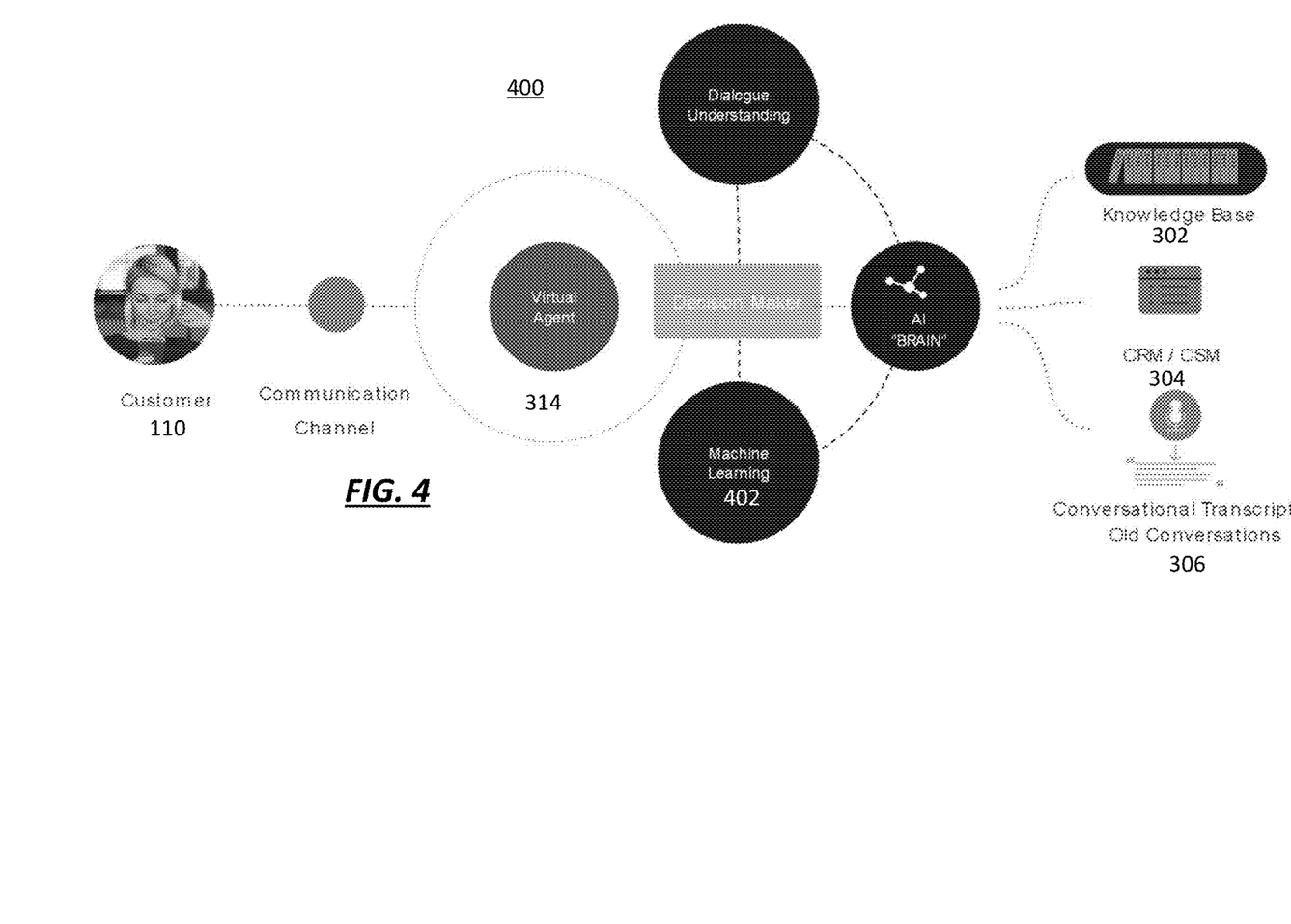
FIG. 4 illustrates additional details of the example components and information flows of the present disclosure.

With reference to FIG. 4, there is illustrated additional details 400 of the example components and information flows 300 of the present disclosure. As shown, a machine learning module 402 may be included to create a large set of all potential of sentences and instances (i.e., a natural language understanding) where the customer 110 said X and meant A, said Y and meant A, said Z but did not mean A, and/or said W and meant B. The sets have several positive and negative examples around concepts, such as "cursing," "being frustrated," "rude attitude," "too pushy for sale," "soft attitude," as well as word level examples, such as "shut up." The machine learning module 402 learns and builds a model out of all of these examples. For example, audio files of conversations 1006 between agents 120 and customers 110 may be input to the machine learning module 402. Alternatively, transcribed words may be input to the machine learning module 402. Next, the system uses the learned model to listen to any conversation in real time and to identify the class such "cursing/not cursing." As soon as the system identifies a class, and if it is negative or positive, it can do the following:

Send an alert to manager
Make an indicator red on the screen
Send a note to an agent or supervisor to be reviewed in real-time or after the interaction
Update some data files for reporting and visualization.

As part of the above, natural language understanding may be used for intent spotting and to determine intent, which may be used for analysis and/or performance monitoring. In this approach words are not important, rather the combination of all of words, the order of words and al potential variations of them have relevance. The machine learning module 402 may add metadata to the interaction, such as the time of the interaction, the duration of the interaction, etc.

Figure 5:
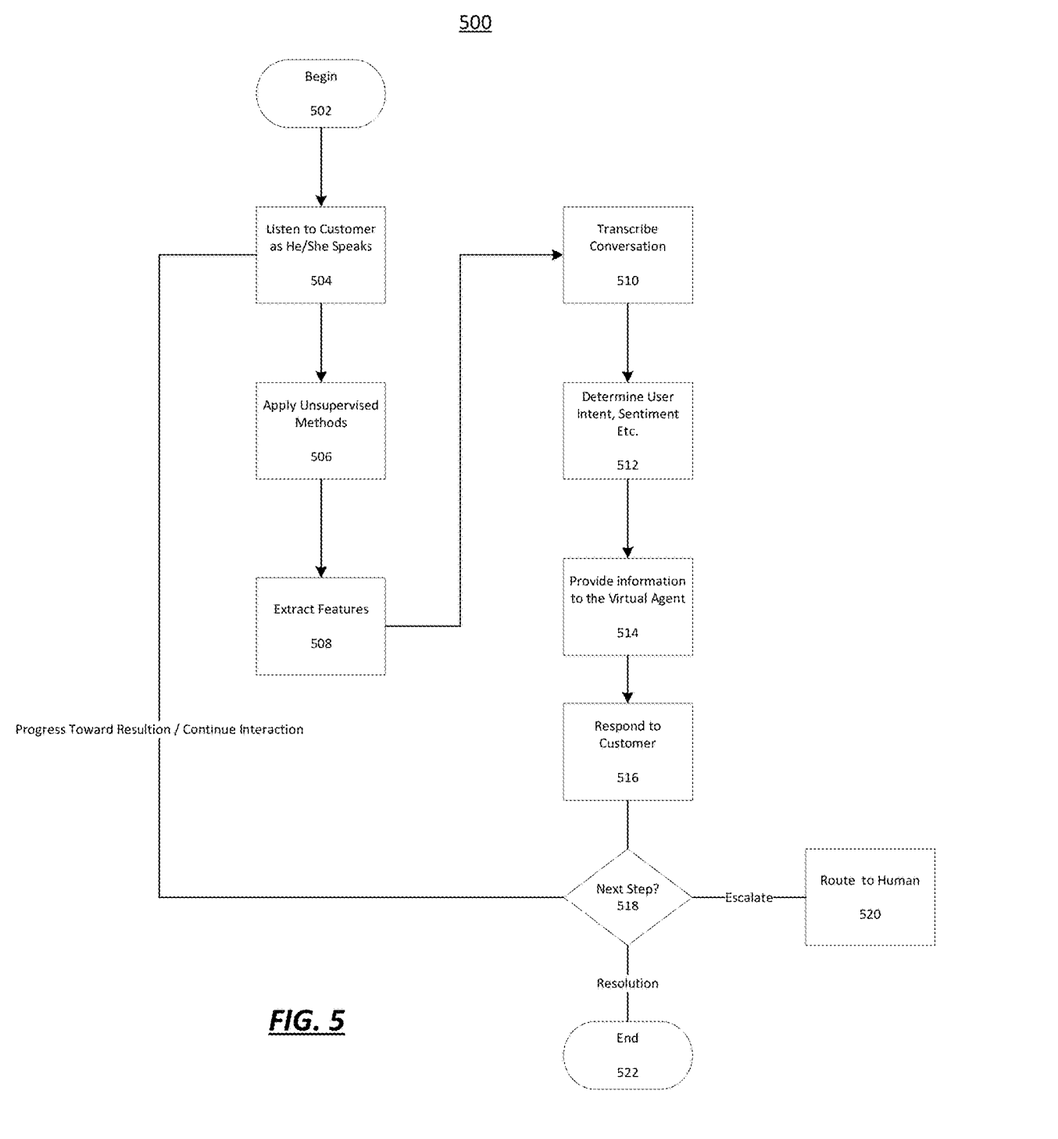
FIG. 5 illustrates example operational flows to provide a human-like interaction with a cloud-based contact center customer.
Figure 6:
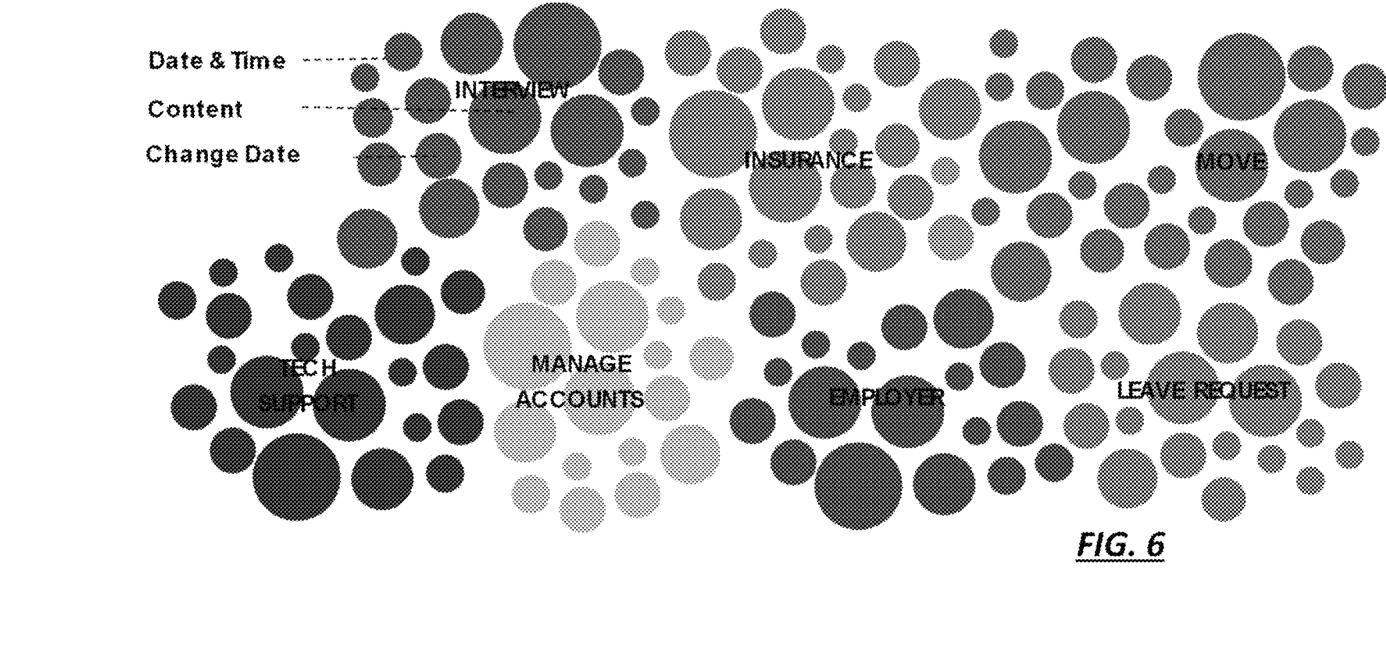
FIG. 6 shows aspects of intent spotting, where topics may be identified.

With reference to FIGS. 5 and 6, there is show an operational flow and user interface describing an example interaction between a customer 110 and a virtual agent. At 502, the process begins wherein the system listens to the customer voice 110 as he or she speaks (S. 504). For example, the automation infrastructure 200 may process the customer speech, as described with regard to FIG. 2. At 506, unsupervised methods may be used to automatically perform one or more of the following non-limiting processes: apply biometrics to authenticate the caller/customer, predict a caller gender, predict a caller age category, predict a caller accent, and/or predict caller other demographics. At 508, the customer voice may be analyzed before transcription to extract one or more of the following non-limiting features:

Pain
Agony
Empathy
Being sarcastic
Speech speed
Tone
Frustration
Enthusiasm
Interest
Engagement Understanding these features helps the virtual agent engine 314 to better understand the customer 110 and to more quickly arrive at a resolution to the customer's needs.

At 510, the customer's speech is transcribed in real-time. This may be performed by the speech-to-text component of the automation infrastructure 200 and saved to a database. At 512, the automation infrastructure 200 determines information about the customer and agent, such as, intent, entities (e.g., names, locations, times, etc.) sentiment, sentence phrases (e.g. verb, noun, adjective, etc.). FIG. 6 shows aspects of intent spotting, where topics may be identified. At 514, from the information determined at 512, the virtual agent engine 314 may access the knowledge graph engine 312 to obtain information responsive to the customer's needs. As shown in FIG. 3, may be information retrieved from the relevant CRM, the most relevant documents in the related knowledge base, and/or a relevant conversation and interaction that occurred in the past that was related to a similar topic or other feature of the interaction between the agent and the customer. The responsive information is provided to the customer 110 in the form of a human-like voice at 516. In some implementations, the responses may be predicated on a decision tree that helps guide the customer 110 to an answer to his or her needs. The root of the tree is the initial question communicated by the virtual agent engine 314. For example, the virtual agent for a financial institution may ask if the customer wants to apply for a loan. The virtual agent may then ask a series of questions based on the branches of the decision tree. Each question further narrows down on the customer's need. In some implementations, the responses may be developed from training data into models used by the machine learning module 402. This may provide for a more flexible set of responses that can quickly focus on the customer needs without having to traverse a decision tree.

At 518, If the virtual agent engine 314 determines progress is being made toward a resolution (e.g., by the analysis at 512) the virtual agent engine 314 continues the process at 504 to continue the interaction with the customer 110. If, however, the virtual agent engine 314 determines that the customer needs require escalation, then the interaction is handed off to a human agent 120 or supervisor at 520. The interaction with the virtual agent may be designed such that the handoff to the human agent 120 or supervisor is seamless. In other words, the virtual agent may "speak" using a voice of the agent or supervisor to which the call will be handed off such the customer 110 is unaware of the handoff. Similarly, the agent 120 may seamlessly send the customer 110 back to the virtual agent. If the virtual agent engine 314 determines that the customer's needs have been attended to, the process ends at 522.

Thus, in accordance with the operational flow of FIG. 5, the virtual agent features of the present disclosure provides for a human-like interaction with the customer to respond to customer needs quickly and accurately, while limiting the need for a human agent to interact with the customer 110. As the customer 110 states his or her need, the virtual agent will provide answers or supporting information immediately to expedite the conversation. By delivering information from CRM 304 or knowledgebase 302 to the virtual agent, customers will realize a time savings and ultimately a reduction in effort to interact with businesses.

Figure 7:
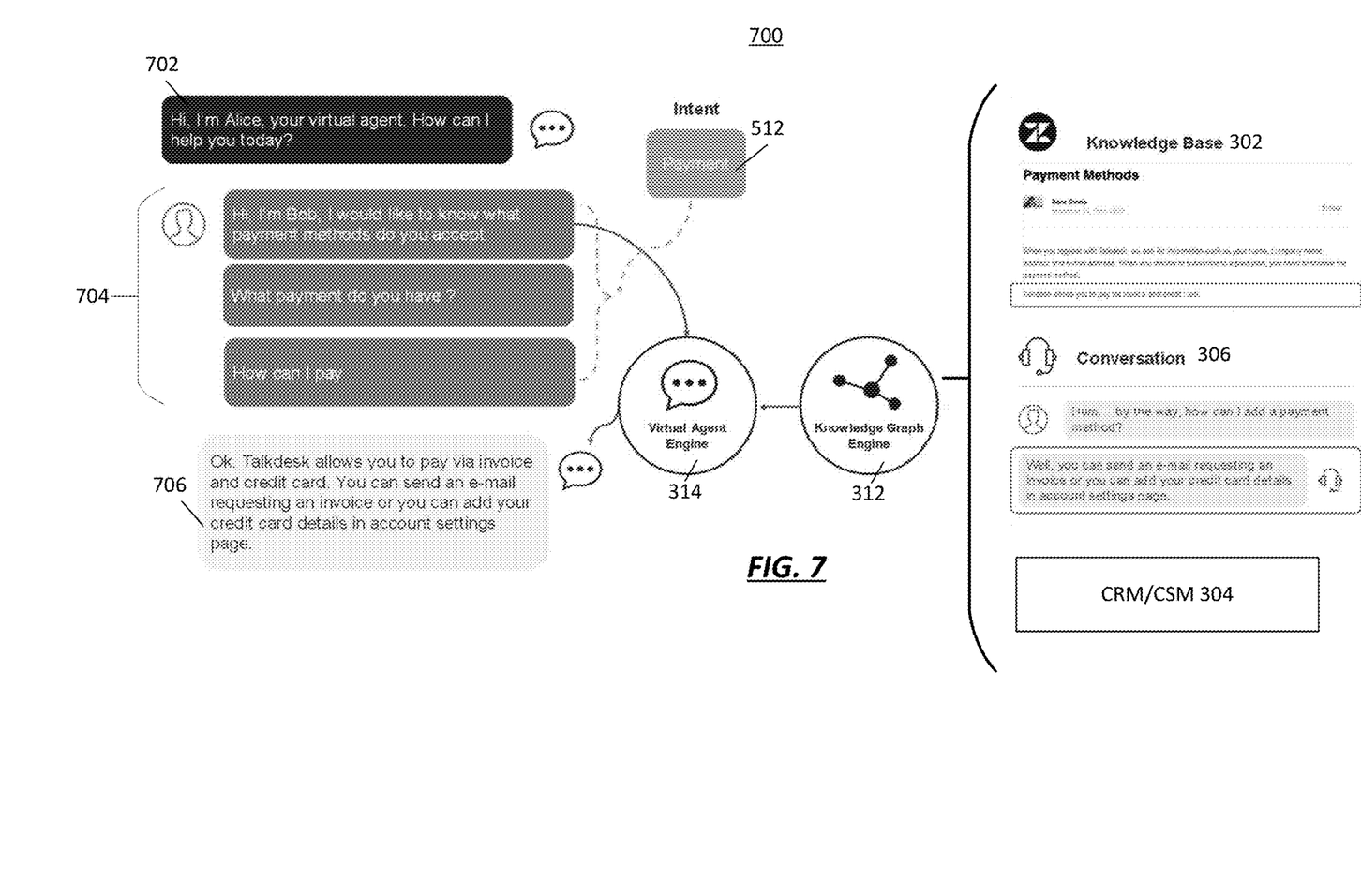
FIG. 7 shows an example user interface and interaction where a customer interacts with a virtual agent via a chat user interface.

While FIG. 5 describes voice interaction, FIG. 7 shows a user interface and interaction where the customer interacts with a virtual agent via a chat user interface (i.e., via text). With regard to FIG. 7, steps 502-512 may not be needed and the process of FIG. 5 may begin with step 512 to determine the customer's intent. In FIG. 7, the customer may be greeted by the virtual agent after the virtual agent engine 314 maps the customer to an available (or otherwise determined) virtual agent (see, 702). The customer may input his or her needs in input field(s) 704 where the intent is determined (S. 512). The virtual agent engine 314 may access the knowledge graph engine 312 to obtain responsive information from one or more of sources 302-306. Responsive to the intent, the virtual agent engine 314 may respond to the customer in field 706 with information addressing the customer needs. The customer input/virtual agent response flows of FIG. 7 may continue as described above in FIG. 5 until a resolution is achieved or escalation is needed.

Virtual Agent with Personality and Authority

Conventional virtual agents do not have personality and only limited authority. The present disclosure provides for many virtual agents that each may have a name and their own personality, accent, attitude etc., which matches with the customer. For example, if a customer talks fast, the virtual agent may talk fast; if customer has southern accent, virtual agent may have a southern accent; if the customer is executive, the virtual agent may use more formal words; and if the customer is informal, the virtual agent may use informal language, etc. Other variations would be understood by one of ordinary skill in the art. Virtual agents with differing personalities address the need for interacting with all types customers having different backgrounds, personalities, etc.

In some implementations, if customer wants to talk to a manager, a manager virtual agent will come on the line and take the call. This agent has the authority for giving discount, voiding fees etc. In some implementations, the virtual agent will be given authority to authority make offers to customers 110. For example, virtual agent may have authority to offer $300 voucher to a passenger who missed her flight due to a technical issue, whereas only a human agent 120 may wave a rebooking fee.

Virtual Agent Detection of Spammers, Fraud calls and Auto Dialers

In some implementations, a virtual agent may answer calls to detect whether the call is spam, a fraud call, or a bot in a totally automated manner. The virtual agent may start a conversation, and after providing a series of questions to the caller, gains an understanding of the intent of the call (at 512). It may be determined that intent of the call is spam, i.e., it is an unwanted call. Here, the determination at 518 may be to continue the interaction to mislead the caller. In addition, the caller may be reported to a proper authority. Fraud may be another intent determined at 512. If so, the virtual agent will determine at 518 to block the caller's number and disconnect the call. Here again, the number may be reported to the authorities. It may also be determined that the caller is an auto dialer. Auto dialers tend to call and wait for a signal, then they start broadcasting a recorded voice. The virtual agent acts a human, and thus starts talking (S. 516) in response to receiving the recorded voice. As soon as the virtual agent detects that the caller is an auto dialer (at S, 512), the virtual agent engine 314 stops the call (at S. 522). Optionally, the callers number may be updated in a database and the authorities informed.

In the above, the virtual agent may also update social media feeds on web servers 160 with a meaningful posts such as "if you get a call from 555-5555 this call is a fraud please do not pick up the phone." The virtual agent may update databases associated with the three different types of callers:

Spammers—with numbers, emails, text numbers, social media accounts and all potential similar phone numbers to that number.

Fraud—all fraudulent phone numbers, emails, text numbers, social media accounts.

Auto dialers—a list of auto dialers.

Virtual Agent Real-time Recommendation, Suggestion and Advertisement.

In some implementations, the virtual agent engine 314 builds a profile of the caller. An example implementation of such notes is provided in 16/668,235, filed Oct. 30, 2019, entitled, "SYSTEM AND METHOD FOR ESCALATION USING AGENT ASSIST WITHIN A CLOUD-BASED CONTACT CENTER," which is incorporated herein by reference in its entirety. The virtual agent through the operations of FIGS. 3-5 may detect customer demographics via voice detection or by retrieving information from the CRM 304 by matching a phone number or customer ID. The virtual agent engine 314 may determine one or more of the following non-limiting aspects during an interaction with a customer: a customer's behavior (e.g., if customer is extrovert or introvert), predict brand preferences (e.g. if customer uses the word "Siri" it means she prefers Apple to Android), discover psychographics (e.g. if a customer orders a vegetarian meal probably she is vegetarian), etc. The machine learning module 402 may predict these elements and by looking at pre-determined models, provide the virtual agent engine 314 with suggestions for new products, renewals of already ordered products, etc. The virtual agent engine 314 may send SMS messages, e-mail or update an adverting feed in an electronic device (e.g. phone) to make such suggestions and renewals.

Personalized Virtual Agents

In accordance with another aspect of the disclosure, a personalized virtual agent is provided to a customer, such as a butler or a concierge. In this implementation, the virtual agent engine 314 will map the customer 110 to his or her own personal virtual agent, who will answer the customer's calls or response to other multi-channel interactions with the contact center 150. That specific virtual agent will know the customer's preferences, address, age, family, etc. through information in the CRM 304. The virtual agent engine 314 will use the machine learning module 402 to learn from every conversation and interaction with the customer 110 to tailor the interactions to be specific customer 110.

The cloud-based contact center 150 may therefore build a customized and personal virtual agent for every single customer. Hence, when Jon Smith calls, he will always talk to his own personal virtual agent called (e.g., "Jim"). Jim will know John very well and will try to address John's needs, as described in FIGS. 3-5. If Jim cannot, he will transfer John to other virtual agents with higher authority or to a live agent.

Socially Aware Virtual Agents

According to another aspect of the disclosure, the virtual agent has access to customer social feeds (e.g., because the customer logged in via a FACEBOOK account on one of web servers 160) and shapes the conversation depends on an understanding from social feed determined by the virtual agent engine 314. For example, the virtual agent may talk about recent trip that the caller posting on INSTAGRAM and offer a discounted hotel because the caller asked about it. As another example, the virtual agent engine 314 may recognize a caller's urgency because the caller posted about family loss and immediately connect the caller to a manager for an expedited response, etc.

Seamless Outbound Cold Calls

Conventionally, machine-based cold calls broadcast a saved message which sounds like a human, but has no capability of interrupting and interacting. The present disclosure improves upon conventional implementations by using virtual agents and machine learning to build a virtual agent that can interact and convince the called party that she is not a virtual agent or chatbot when making cold calls. The virtual agent uses a convincing voice and live dialogue to entice the customer to listen to the conversation. Such a conversation is beyond a simple line of speech, as it proceeds to the point that customer may answer several questions presented by the virtual agent.

Figure 8:
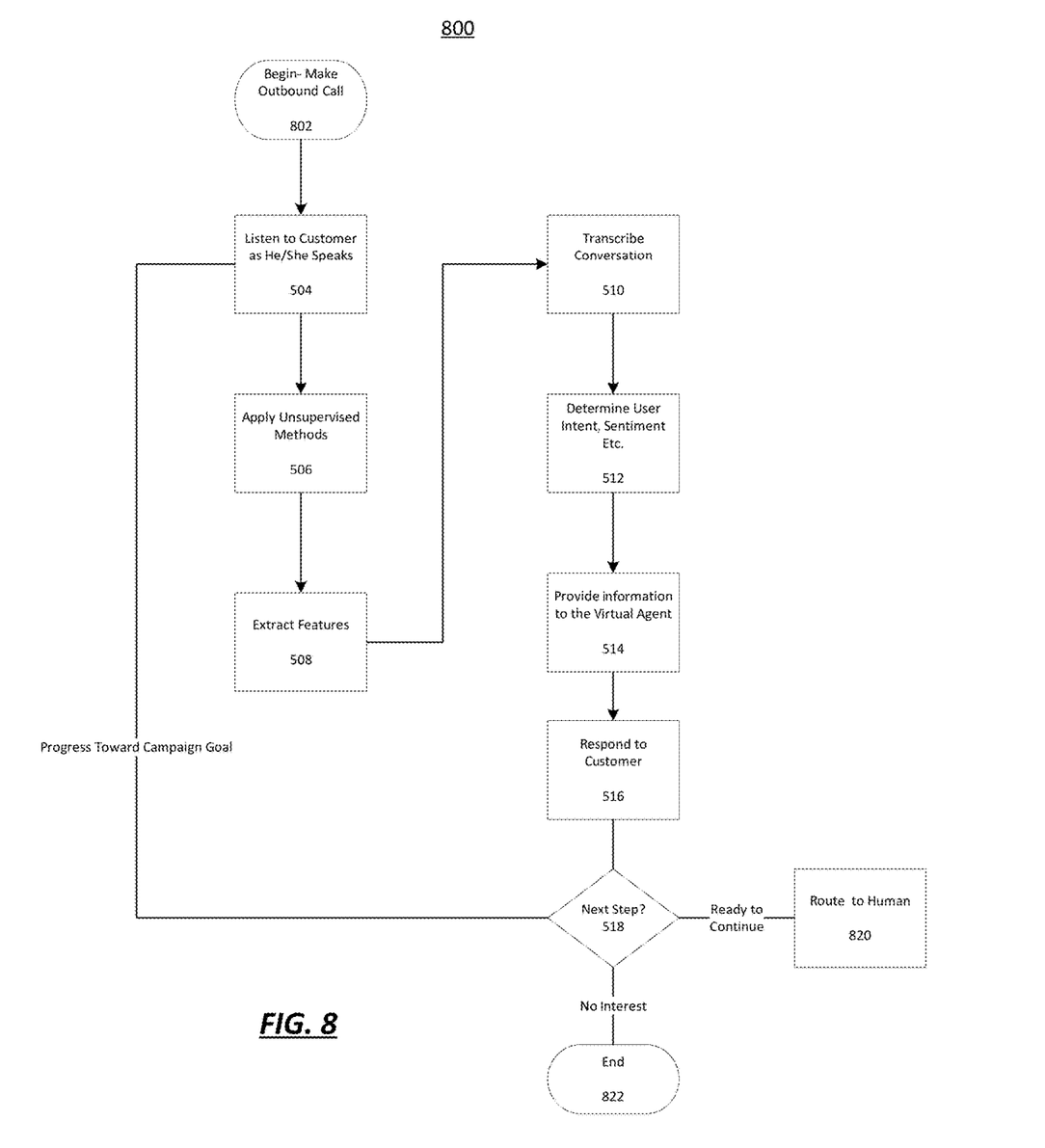
FIG. 8 illustrates an example operational flow describing a seamless outbound call interaction between a customer and a virtual agent.

With reference to FIG. 8, there is show an operational flow describing an example outbound call interaction between a customer 110 and a virtual agent. At 802, the process begins wherein the virtual agent calls a customer 110. Processes 504-516 remain the same as described above. At 818, If the virtual agent engine 314 determines progress is being made toward a result of the outbound campaign (e.g., by the analysis at 512) the virtual agent engine 314 continues the process at 504 to continue the interaction with the customer 110. If the virtual agent engine 314 determines that the customer is ready to speak with a human agent, then the interaction is handed off to the human agent 120 or supervisor at 820. The interaction with the virtual agent may be designed such that the handoff to the human agent 120 or supervisor is seamless. In other words, the virtual agent may "speak" using a voice of the agent or supervisor to which the call will be handed off such the called party is unaware of the handoff. Similarly, the agent may seamlessly send the party back to the virtual agent. If the virtual agent engine 314 determines that the customer is not interested in the subject of the outbound campaign, then the process ends at 822.

Thus, in accordance with the operational flow of FIG. 8, the virtual agent features of the present disclosure provides for a human-like interaction with the customer as part of an outbound calling campaign.

Virtual Agents to Check Caller Identity via Multi Channels.

Figure 9:
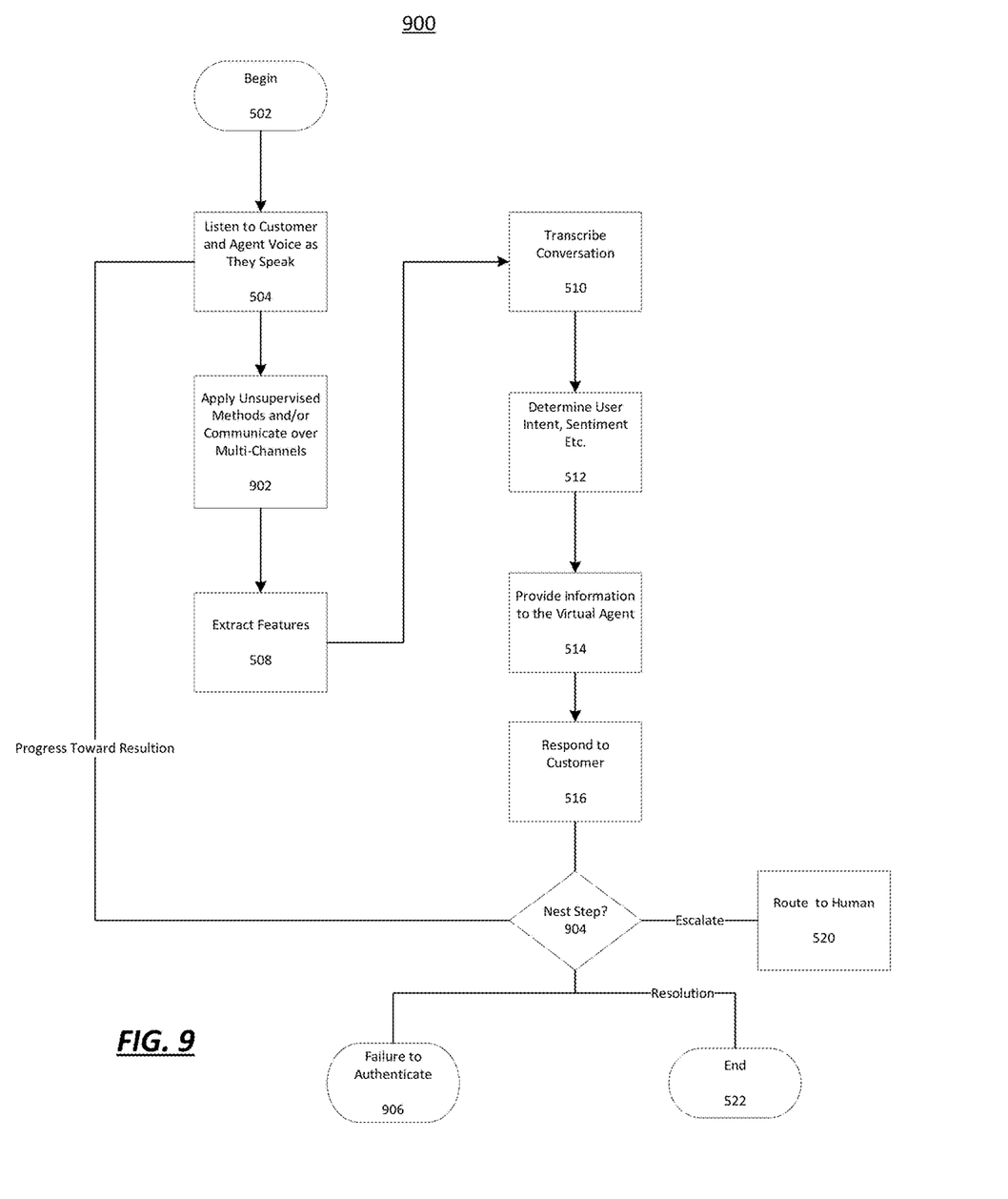
FIG. 9 illustrates an example operational flow for caller identification.

In accordance with an aspect of the present disclosure, the virtual agent may identify the caller using different methods. Conventionally, customer identification is performed by sending an SMS text or email to the caller, and asking the caller to confirm the email or SMS text. Herein, a method 900 is provided to determine a caller's identity via multi-channels. In FIG. 9, like reference number refer to like processes described above and are not repeated below. With reference to FIG. 9, processes 502-504 are performed. At 902, as described above, unsupervised methods may be used to automatically perform one or more of the following non-limiting processes: apply biometrics to authenticate the caller/customer, predict a caller gender, predict a caller age category, predict a caller accent, and/or predict caller other demographics. The customer voice may also be analyzed before transcription to extract one or more of the features described above. In addition, multi-channel sources may be accessed to authenticate the user. This may include submitting queries to search engines, accessing social media feeds (FACEBOOK, LINKEDIN, TWITTER), etc. to confirm information about the customer 110. As this may take some time, processes 508-516 may continue.

The first time the decision point 904 is reached, the virtual agent engine 314 may determine if authentication failed, and if so, end the call at 906. The failure may be based on any item of information determine at 902 or a combination of items. Subsequent decisions at 904 will check If progress is being made toward a resolution, the customer needs require escalation, or if a resolution has been reached, as described above.

Thus, in accordance with the operational flow of FIG. 9, the virtual agent features of the present disclosure provides for a human-like interaction with the customer as well as multi-channel authentication.to respond to customer needs quickly and accurately, while limiting the need for a human agent to interact with the customer 110. As the customer 110 states his or her need, the virtual agent will provide answers or supporting information immediately to expedite the conversation. By delivering information from CRM 304 or knowledgebase 302 to the virtual agent, customers will realize a time savings and ultimately a reduction in effort to interact with businesses.

General Purpose Computer Description

Figure 10:
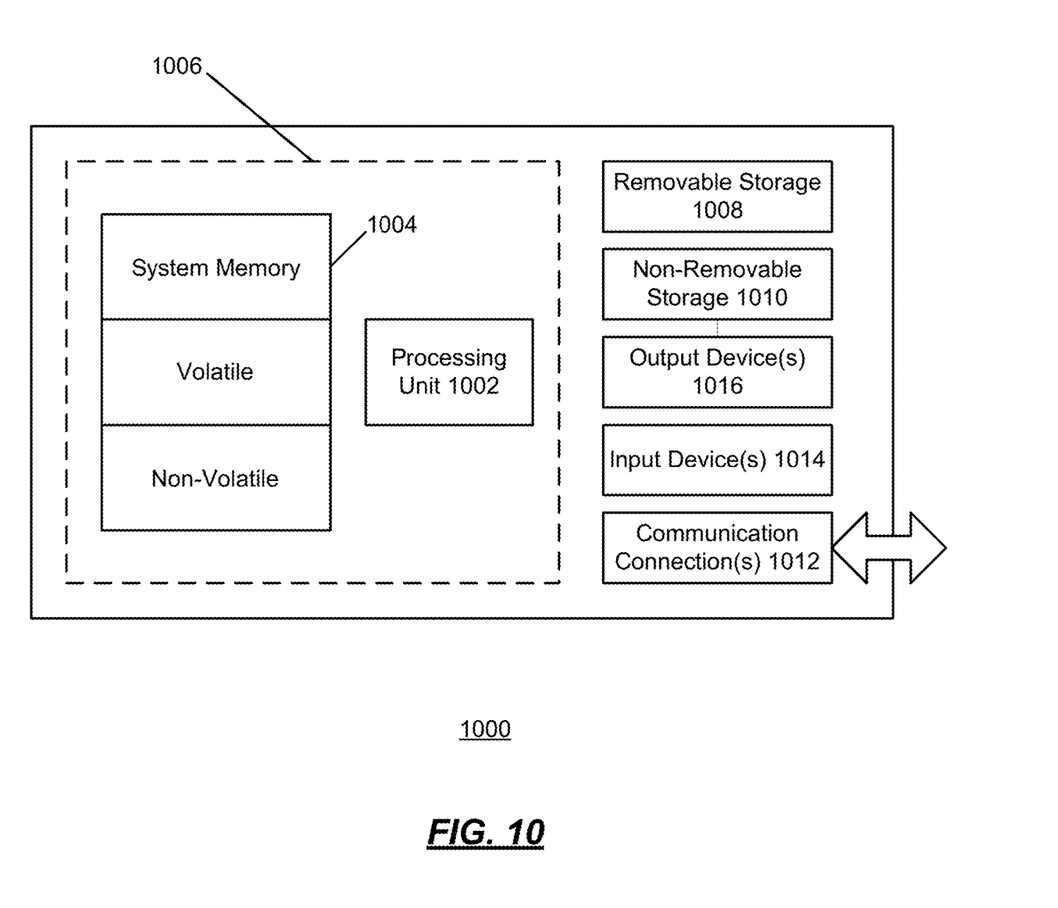
FIG. 10 illustrates an example computing device.

FIG. 10 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of tangible computer readable media. Computer readable media can be any available tangible media that can be accessed by device 1000 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communications connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
    making an outbound call to contact a perspective customer;
    receiving, by a virtual agent, first speech input from the perspective customer;
    converting the first speech to first text for analysis by a knowledge graph engine to retrieve responsive information to the first text from multiple sources and providing the information to a virtual agent engine;
    converting the responsive information to second speech that is provided to the perspective customer;
    transferring the customer from the virtual agent with a first authority level to a second virtual agent with a second authority level, wherein the virtual agent and second virtual agent both use the second speech; and
    repeating the receiving and converting of the first speech and the second speech until the perspective customer is ready to be seamlessly transferred to a human agent or until the outbound call is terminated.

2. The method of claim 1, further comprising personalizing the second speech in accordance with the human agent to which the call will be seamlessly transferred.

3. The method of claim 2, further comprising adapting the second speech of the virtual agent engine to a speech pattern of the human agent.

4. The method of claim 2, further comprising adapting a diction used in the second speech of the virtual agent engine to a diction of the human agent.

5. The method of claim 2, further comprising adapting an accent of the second speech to an accent of the human agent.

6. The method of claim 1, further comprising authorizing the virtual agent engine to autonomously resolve a customer issue.

7. The method of claim 1, further comprising:
    using a machine learning module that builds a model from groups of words and phrases;
    applying the model to the first speech input to determine a customer intent.

8. The method of claim 7, further comprising taking a subsequent action upon determining the customer intent.

9. The method of claim 1, wherein seamlessly transferring the perspective customer to the human agent is imperceptible to the perspective customer.

10. A cloud-based software platform comprising: one or more computer processors; and one or more computer-readable mediums storing instructions that, when executed by the one or more computer processors, cause the cloud-based software platform to perform operations comprising:
    making an outbound call to contact a perspective customer;
    receiving, by a virtual agent, first speech input from the perspective customer;
    converting the first speech to first text for analysis by a knowledge graph engine to retrieve responsive information to the first text from multiple sources and providing the information to a virtual agent engine;
    converting the responsive information to second speech that is provided to the perspective customer;
    transferring the customer from the virtual agent with a first authority level to a second virtual agent with a second authority level, wherein the virtual agent and second virtual agent both use the second speech; and
    repeating the receiving and converting of the first speech and the second speech until the perspective customer is ready to be seamlessly transferred to a human agent or until the outbound call is terminated.

11. The cloud-based software platform of claim 10, further comprising instructions to cause operations comprising personalizing the second speech in accordance with the human agent to which the call will be seamlessly transferred.

12. The cloud-based software platform of claim 11, further comprising instructions to cause operations comprising adapting the second speech of the virtual agent engine to a speech pattern of the human agent.

13. The cloud-based software platform of claim 11, further comprising instructions to cause operations comprising adapting a diction used in the second speech of the virtual agent engine to a diction of the human agent.

14. The cloud-based software platform of claim 11, further comprising instructions to cause operations comprising adapting an accent of the second speech to an accent of the human agent.

15. The computer-readable medium of claim 14 further comprising instructions stored thereon whereby execution of the instructions by a processor further cause the processor to:
   use a machine learning module that builds a model from groups of words and phrases; and
   apply the model to the first speech input to determine a customer intent.

16. The cloud-based software platform of claim 10, further comprising instructions to cause operations comprising authorizing the virtual agent engine to autonomously resolve a customer issue.

17. The cloud-based software platform of claim 10, further comprising instructions to cause operations comprising:
   using a machine learning module that builds a model from groups of words and phrases;
   applying the model to the first speech input to determine a customer intent.

18. The cloud-based software platform of claim 17, further comprising instructions to cause operations comprising taking a subsequent action upon determining the customer intent.

19. The cloud-based software platform of claim 10, wherein seamlessly transferring the perspective customer to the human agent is imperceptible to the perspective customer.

20. A non-transitory computer readable medium for a cloud-based software platform, the computer readable medium comprising instructions stored thereon whereby execution of the instructions by a processor cause the processor to:
   make an outbound call to contact a perspective customer;
   receive, by a virtual agent, first speech input from the perspective customer;
   convert the first speech to first text for analysis by a knowledge graph engine to retrieve responsive information to the first text from multiple sources and providing the information to a virtual agent engine;
   convert the responsive information to second speech that is provided to the perspective customer;
   transfer the customer from the virtual agent with a first authority level to a second virtual agent with a second authority level, wherein the virtual agent and second virtual agent both use the second speech; and
   repeat the receiving and converting of the first speech and the second speech until the perspective customer is ready to be seamlessly transferred to a human agent or until the outbound call is terminated.

* * * * *